US008321897B2

(12) United States Patent
Sato et al.

(10) Patent No.: US 8,321,897 B2
(45) Date of Patent: Nov. 27, 2012

(54) TRANSMISSION METHOD AND TRANSMITTER

(75) Inventors: Makoto Sato, Tokyo (JP); Tatsuya Igarashi, Tokyo (JP); Yukihiko Aoki, Tokyo (JP); Takuro Noda, Tokyo (JP); Hisato Shima, Tokyo (JP)

(73) Assignee: Sony Corporation, Tokyo (JP)

( * ) Notice: Subject to any disclaimer, the term of this patent is extended or adjusted under 35 U.S.C. 154(b) by 1299 days.

(21) Appl. No.: 10/296,886

(22) PCT Filed: Apr. 3, 2002

(86) PCT No.: PCT/JP02/03356
§ 371 (c)(1),
(2), (4) Date: Jun. 2, 2003

(87) PCT Pub. No.: WO02/082282
PCT Pub. Date: Oct. 17, 2002

(65) Prior Publication Data
US 2003/0185156 A1 Oct. 2, 2003

(30) Foreign Application Priority Data
Apr. 3, 2001 (JP) ................................ 2001-105163

(51) Int. Cl.
H04N 7/18 (2006.01)
H04N 7/173 (2011.01)
H04N 7/16 (2011.01)
G06F 15/16 (2006.01)

(52) U.S. Cl. ............ 725/80; 725/82; 725/133; 725/141; 725/153; 709/203; 709/217; 709/218; 709/219

(58) Field of Classification Search ..................... None
See application file for complete search history.

(56) References Cited

U.S. PATENT DOCUMENTS

| 6,493,874 B2 * | 12/2002 | Humpleman ................... 725/78 |
| 7,024,677 B1 * | 4/2006 | Snyder et al. ................... 725/86 |
| 7,080,399 B1 * | 7/2006 | Yanagawa et al. ............ 725/109 |
| 7,100,192 B1 * | 8/2006 | Igawa et al. .................... 725/112 |
| 7,200,683 B1 * | 4/2007 | Wang et al. .................... 709/250 |
| 2002/0038334 A1 * | 3/2002 | Schneider et al. ............ 709/203 |
| 2003/0235206 A1 * | 12/2003 | Heller ............................ 370/467 |

FOREIGN PATENT DOCUMENTS

| EP | 0 837 579 | 4/1998 |
| EP | 0 912 036 | 4/1999 |
| EP | 0 936 788 | 8/1999 |
| EP | 1 052 574 | 11/2000 |
| EP | 1 071 255 | 1/2001 |

(Continued)

Primary Examiner — Nasser Goodarzi
Assistant Examiner — Fred Peng
(74) Attorney, Agent, or Firm — Frommer Lawrence & Haug LLP; William S. Frommer; Thomas F. Presson

(57) ABSTRACT

A system and method for controlling the transmission of contents among a plurality of audio/video (AV) devices by using a general purpose network In case of transmitting the contents held in a first device (source) to a second device (sink) by way of a designated transmission path, information relating to the transfer protocol for transmitting the contents is added to each content when the contents information held in the first device is disclosed to a controller on the network. Transmission management is performed based on the information on the transfer protocol added to each content when starting transmission of the contents between the first device and the second device.

15 Claims, 9 Drawing Sheets

FOREIGN PATENT DOCUMENTS

| | | |
|---|---|---|
| JP | 09 114724 | 5/1997 |
| JP | 10-126423 | 5/1998 |
| JP | 11-88406 | 3/1999 |
| JP | 2000-216845 | 8/2000 |
| JP | 2000-253463 | 9/2000 |
| JP | 2001-6276 | 1/2001 |
| JP | 2001-16236 | 1/2001 |
| WO | WO 00/44146 | 7/2000 |

\* cited by examiner

TRANSMISSION METHOD AND TRANSMITTER

TECHNICAL FIELD

The present invention relates to a transmission method and transmission apparatus suitably applied to transmission of, e.g., video and audio contents between devices using a machine control protocol which is commonly used, e.g., in IP (internet protocol) network.

BACKGROUND ART

In recent years, proposed are video equipment and audio equipment such as video recorders, audio recorders, television receivers, tuners for receiving various broadcastings and audio amplifiers (referred to as AV equipment or AV devices hereinafter) to be connected to any form of network, such that video data and audio data are transmitted between the interconnected AV devices for sending or receiving data between such devices. Such networking is increasing practicable.

For example, developed are AV devices capable of transmitting data through a network using the IEEE (The Institute of Electrical and Electronics Engineers) 1394 serial data bus. In such network, contents data such as video data and audio data can be transmitted as stream data, and the use of a predetermined command (AV/C Command Transaction Set which is referred to as AV/C commands hereinafter) makes it possible to control the AV devices connected to such network.

In order to transmit the contents data over the designated network, relatively complicated transmission management was required, because it is necessary to acquire channel and bandwidth of the transmission path, to perform plug management for setting the data output and input plugs of each device, and to control transfer contents using the plugs set by such management. As a general purpose network capable of connecting electronic apparatus such as computers, so-called IP protocol configurable networks (such networks using the IP protocol are referred to as IP networks hereinafter) are widely used, but conventionally, it was difficult to control the transfer processing of contents from one AV device to another AV device. In particular, in case of the network using IP protocol, there are various usable protocols, and it was therefore necessary for the user to match the protocol and the like in advance between the sending device and the receiving device. The situation was the same in case of transmitting (or transferring) contents using general purpose networks other than the IP network.

DISCLOSURE OF INVENTION

The object of the present invention is to enable transmission of contents using a general purpose network by simple control.

A first invention is a transmission method for transmitting contents from a first device holding the contents to a second device by way of a desired transmission path, comprising the steps of: adding information relating to the transfer protocol for outputting the contents for each of the contents when disclosing the information of the contents which are held in the first device to a controller of the transmission path; and performing transmission management based on the information relating to the transfer protocol which is added to the contents at the time when starting transmission of the contents between the first device and the second device.

In case of transmitting contents, the above arrangement enables to control initiation of transmission by a correct transfer protocol suitable for transmission of the contents, thereby simply transmitting the contents using a general purpose network from the first device to the second device based on the instructions of the controller.

A second invention is the transmission method of the first invention, wherein the information relating to the transfer protocol to be added to each of the contents is adapted to list up one or more protocols which can become transmissible by instruction and setting thereof.

The above arrangement enables to simply select a corresponding protocol among the listed protocols.

A third invention is the transmission method of the first invention, wherein the information relating to the transfer protocol to be added to each of the contents includes information relating to a location unified within its device.

The above arrangement ensures that the instructions based on the protocol are surely reached.

A fourth invention is the transmission method of the first invention, wherein a logical or physical plug which is used in case of transferring the contents is disclosed as a virtual content.

The above arrangement enables to set a plug to be used for transmission by using a virtual content.

A fifth invention is the transmission method of the first invention, wherein the controller instructs the second device to load the contents by a designated communication protocol.

The above arrangement enables to simplify the loading of the contents.

A sixth invention is the transmission method of the fifth invention, wherein a third device for processing or holding the contents is further included in addition to the second device, and the controller is adapted to instruct one or more protocols to each of the second and third devices.

The above arrangement easily realize, for example, processing and holding the contents in separate devices.

A seventh invention is the transmission method of the sixth invention, wherein adjustment is performed to select which protocol be used among the instructed transfer protocols between the second and third device.

The above arrangement enables to select the most appropriate protocol.

An eighth invention is the transmission method of the sixth invention, wherein the second or third device loaded with the contents is adapted to disclose the plug that can be outputted by itself as a virtual content.

The above arrangement makes it possible to transmit the content from, e.g., the second device to the third device by the same processing as the transmission from the first device.

A ninth invention is the transmission method of the fifth invention, wherein the controller is adapted to transmit in a designated format command the instructions for an operation in connection with processing the transmitted contents to the second device when the transmitted contents contain video or audio information.

The above arrangement enables the controller to perform remote control the recording or playback operation and the like of the content transferred to, e.g., the second device.

A tenth invention is the transmission method of the ninth invention, wherein a third device for processing or holding the contents is further included in addition to the second device, and the controller is adapted for transmitting the instructions for the operation in a designated format command in connection with processing the transmitted contents also to the third device by a designated format command.

The above arrangement makes it possible to perform remote control of a plurality of devices using a general purpose protocol.

An eleventh invention is the transmission method of the first invention, wherein the contents held in the first device are designated files and the upload and download of the files are carried out by the transfer protocol.

The above arrangement makes it possible to transfer the file between the devices by a similar processing.

A twelfth invention is a transmission apparatus comprising: communication means for communicating with another device by way of a designated transmission path; contents holding means capable of holding one or more contents; and control means for sending information relating to the contents held in the contents holding means from the communication means by adding information relating to a transfer protocol for outputting each of the contents.

In case of instructing for transferring the contents held in the content holding means from other device, the above configuration makes it possible to transfer the correct content using the information relating to the transfer protocol which is sent out of the communication means for understanding what transfer protocol is to be used for the instructions.

A thirteenth invention is the transmission apparatus of the twelfth invention, wherein the control means adds information of listed up one or more protocols which can become transmissible by setting of the instructions from another device as information relating to a transfer protocol.

The above arrangement simplifies the selection of the corresponding protocol among the listed protocols in the device receiving the contents.

A fourteenth invention is the transmission apparatus of the twelfth invention, wherein the control means adds information relating to a location unified within its device as information relating to the transfer protocol.

The above arrangement ensures that the instructions based on the protocol are surely reached.

A fifteenth invention is the transmission apparatus of the twelfth invention, wherein the communication means is provided with a logical or physical plug to be used in transferring the contents, and the control means adds to the information relating to the transfer protocol information of listed up one or more protocols which can become transmissible by setting the plug as a virtual content as information relating to the protocol by an instruction from another device.

The above arrangement enables to set the plug to be used for transmission by using the virtual contents for.

A sixteenth invention is the transmission apparatus comprising: communication means for communicating with another device by way of a designated transmission path; and control means adapted to communicate with a first device by means of the communication means for generating information relating to a content held in the first device and a first command for requesting the transfer protocol of the content, and adapted to communicate with a second device by means of the communication means for generating a second command instructing a receiving of a particular content in the information acquired in response to the first command by designating a transfer protocol added to the information acquired in the response.

The above arrangement enables to simply control the transmission of the contents using a general purpose network in case of instructing the first device to transfer the contents held in itself to the second device, because such control as the start of transmission can be performed by the correct transfer protocol that is most suitable for the transmission of the contents.

A seventeenth invention is the transmission apparatus of the sixteenth invention, wherein the control means is adapted to transmit the operation instruction in connection with the processing of the transmitted content from the communication means to the first or second device by a designated format command when the content transmitted from the first device contains video or audio information.

The above arrangement makes it possible to use a general purpose protocol for remote controlling the recording or playback the contents, e.g., in the device which received the transferred contents.

BEST MODE OF CARRYING OUT THE INVENTION

Now, one embodiment of the present invention will be described hereunder with reference to the accompanying drawings.

Figure 1:
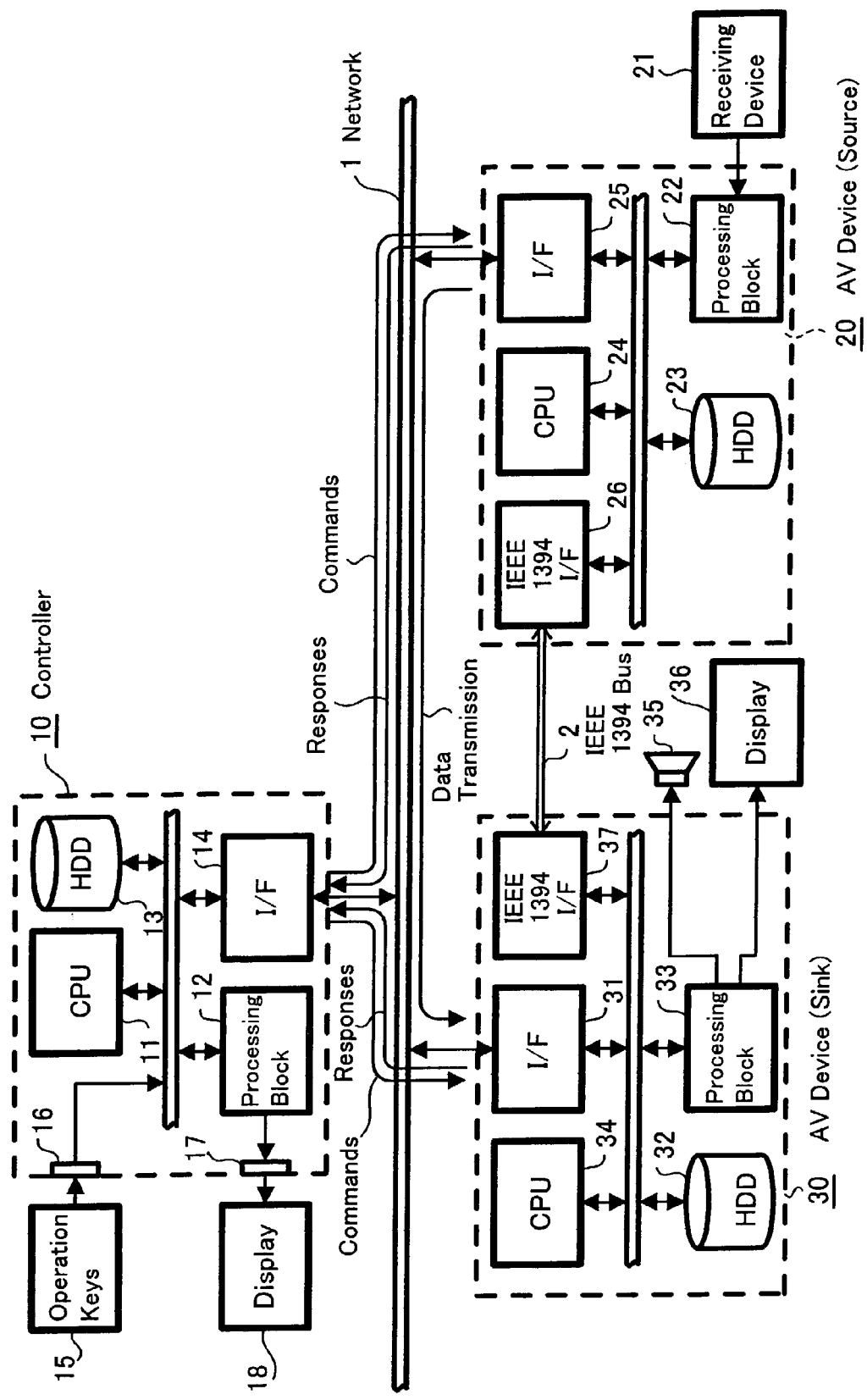
FIG. 1 is a block diagram showing a system configuration of one embodiment according to the present invention.

The embodiment utilizes an IP protocol configuration network for performing transmission (or transfer) of contents data among a plurality of devices such as AV (audio-video or audio visual) devices, and description will be first made on the system configuration by reference to FIG. 1.

In FIG. 1, a plurality of AV devices 20, 30 is connected to a controller 10 through a predetermined network 1. As the IP protocol configuration network 1, an Ethernet can be applied, for example. It is also possible to configure the network by way of the internet or the like.

The controller 10 is a device which is able to control the AV devices 20, 30, and e.g., a personal computer is adapted thereto. As a configuration of the controller 10, a central processing unit (CPU) 11 for performing operation processing for control, a processing block 12 for performing processing for display or the like, a hard disk drive 13 as data storage means and an interface 14 for communication with the network 1 are interconnected by way of an internal bus. Further it is so configured that operation information of operation keys 15 comprised of operation means such as a keyboard or the like is supplied inward through a port 16. Also it is so configured that video data generated by the processing block 12 is supplied to a display 18 connected to the controller 10 by way of a port 17 to display.

The AV device 20 is connected to a receiving device 21, herein, for receiving a broadcast to acquire video data and audio data, and the video data and the audio data acquired from the receiving device 21 at a processing block 22 within the device 20 are able to be stored as contents data in a hard disk of a hard disk drive 23 which is an internal storage means. Additionally, the AV device 20 comprises a CPU 24 as control means and an interface 25 for communicating with the network 1, and is so arranged as to send out the contents stored in the hard disk to the network 1 or to store in the hard disk the contents received by the interface 25 from the network 1 side.

The AV device 20 is also provided with an IEEE1394 interface 26 for connecting to an IEEE1394 type serial bus 2 for sending the contents thereto by way of the bus 2 or to receive the contents from the bus 2. In the IEEE1394 type serial bus 2 through the IEEE1394 interface 26, it is possible to control the other devices by transmitting commands using AV/C commands and responses thereto.

In this embodiment, the AV device 30 is connected to a speaker 35 for outputting the received audio data and a display 36 for displaying the received video data. The AV device 30 comprises an interface 31 for communicating with the network 1, a hard disk drive 32 as storage means, a processing block 33 as processing means of the video data and the audio data and a CPU 34 as control means. The hard disk drive 32 can be used for storing the contents received by way of the network 1 or to send out the contents stored in the hard disk to the network 1. Also, it is so configured if the contents stored in the hard disk are audio data or video data, such audio data or video data are processed for output in the processing block 33 to be outputted from the speaker 35 or to be displayed on the display 36 connected thereto.

Additionally, the AV device 30 is also provided with an IEEE1394 interface 37 to be connected to the IEEE1394 type serial bus 2 for sending out the contents to the bus 2 or receiving the contents from the bus 2. In the IEEE1394 type serial bus 2 through the IEEE1394 interface 37, it is possible to control other devices by transmitting commands using AV/C commands or responses. However, it should be noted that the connection between the AV devices 20, 30 by the IEEE1394 type serial bus 2 can be eliminated.

In the present embodiment, provided that the system is configured by connecting the controller 10 and the AV devices 20, 30 by way of the network 1, the controller 10 sends commands to each of AV devices 20, 30 in accordance with the IP protocol, and is able for the AV device 20 to transmit the stored contents data to the AV device 30 by way of the network 1. Also, in certain cases, such contents data can be transmitted over the IEEE1394 type bus 2 interconnecting the AV devices 20, 30. It is to be noted that when commands are sent from the controller 10 and the like to each AV device 20, 30 through the network 1, responses are to be returned from the received device of the commands.

Figure 2:
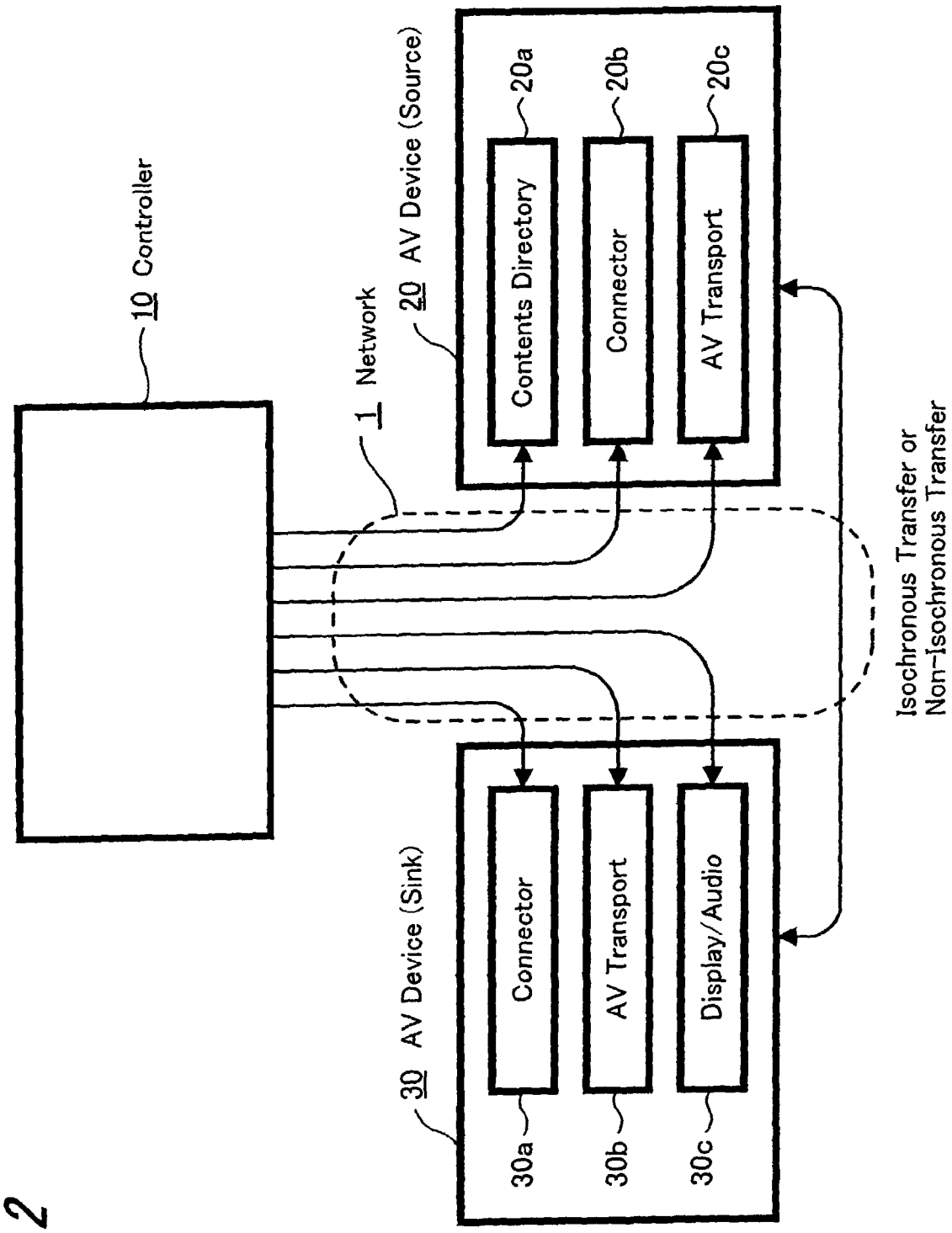
FIG. 2 is a schematic showing an example of the transmission condition of the one embodiment according to the present invention.

Now, an exemplified functional network configuration necessary for transmitting data between the AV devices 20, 30 by instructions from the controller 10 of the network 1 to which the AV devices 20, 30 are connected is illustrated in FIG. 2. In this figure, it is an example of transmitting the contents data stored in the hard disk of the AV device 20 to the AV device 30. The AV device 20 as a sending side device is named as a source, while the AV device 30 as a receiving side device is named as a sink.

The AV device 20 side is provided with a contents directory 20a as the data stored in the hard disk, and the list of the stored contents is stored in this contents directory 20a, The contents directory 20a has data expressed by an expressing method of the HTTP (Hyper Text Transfer Protocol) format that can be transferred by the IP protocol. It contains the drive name (drive 1, drive 2, etc.) in which the contents are stored and the data format (MPEG2 or the like) of the contents. Also in the list, the information of the transfer protocol (e.g., HTTP, FTP, rtsp, etc.) for outputting the respective contents. If there is a plurality of transfer protocols for single contents, all of the corresponding transfer protocols are indicated.

Also in the contents information recorded in the contents directory 20a, the information of the unified location within the device 20 is is included, and such locations (absolute path name, etc.) are disclosed in the standardized expression format known as URL (Uniform Resource Locator).

Additionally, in the contents information recorded in the contents directory 20a, the information of the logical or physical plug to be used at the time of transferring the contents as indicated as the virtual contents is to be included. Also, when indicating the logical or physical plug as a virtual content, it is possible to indicate it in both of the output side and the input side in the data transfer. Special names are given to such virtual contents. One example of such names is "livestream".

The information of the contents directory 20a within the device 20 can be disclosed to the controller 10 as a response to transmission of a "LocateItems" command from the controller 10. The "LocateItems" command and its response have data configuration of HTTP format data in accordance with the IP protocol.

Both AV devices 20, 30 have connector information 20b, 30a, and are to be set which connection be used in response to the instruction of a connection ID.

Each of the devices 20, 30 is provided with a functional portion 20c, 30b which judges the AV transport command in accordance with the IP protocol from the controller 10 and performs the processing based on that command. The AV transport commands include "upload" for sending out the contents data from the source into the network, "download" for receiving at the sink received the data sent out to the network, "record" for recording the contents data on to the media, "pause" for temporarily stopping the recording and "play" for directing the playback from the media. It is also possible to have other commands such as, e.g., variable speed playback.

Additionally, there is a special command named or known as "live-pause". The "live-pause" command is a command for making a temporal pause condition when the contents as stream data such as broadcasting signals are received through the network, for buffering the stream data during the pause condition, and for outputting the buffered data when the pause is released such that a virtual pause can be performed for such currently broadcasted contents.

The sink side AV device 30 in this embodiment is provided with a function portion 30c for making judgment of the display/audio commands, and transmission of the corresponding commands from the controller 10 makes it possible to perform, e.g., adjustment of the image to be displayed on the display 36 connected to the AV device 30 as well as adjustment of the audio outputted from the speaker 35.

The transmission of the contents data between the source and the sink is carried out in the isochronous or non-isochronous transfer mode. Instead of transmitting the contents data such as audio data or video data, it is possible to indicate a file as a certain contents in the contents directory and to perform the file transfer in the same processing when the contents corresponding to the file are instructed.

Now, examples of commands and responses in the contents directory expressed in the HTTP format or commands and responses in the AV transport are basically shown as the following Table 1.

TABLE 1

```
POST (path of control URL)HTTP/1.1
HOST: (host of control URL): (port of control URL)
CONTENT-LENGTH: (bytes in body)
CONTENT-TYPE:text/xml;charset="utf-8"
SOAPACTION:"urn:schemas-upnp-org:service: (serviceType:v#ac
tionName")
<s:Envelope
xmlns:s="http://schemas.xmlsoap.org/soap/envelope/"
s:encodingStyle="http://schemas.xmlsoap.org/soap/encoding/"
<s:Body>
<u:actionName
xmlns:u="urn:schemas-upnp-org:service: (serviceType:v")
<argumentName>in arg value</argumentName>
other in args and their values go here, if any
</u: actionName>
</s:Body>
</s:Envelope>
```

Such data as the corresponding address (URL) number of bytes indicating the data length and name are positioned in the parentheses in the data which have the structure as exemplified in the above Table 1.

An example of the command to be sent has the structure in the later part of the above data as shown in the following Table 2.

TABLE 2

```
<s:Envelope
xmlns:s="http://schemas.xmlsoap.org/soap/envelope/"
s:encodingStyle="http://schemas.xmlsoap.org/soap/encoding/
"
<s:Body>
<u:Load
xmlns:u="urn:schemas-upnp-org:service:AVTransport:1">
<SourcePath>/drive1/FunnyFace.mpeg</SourcePath>
<Transport>ftp,http</Transport>
</u:Load>
</s:Body>
</s:Envelope>
```

In the above example, loading of the data is instructed and the information related to the contents is the SourcePath indicating the drive 1 as the storage location of the data, [FunnyFace] as the data name and the data being the mpeg format. It indicates that both FTP and HTTP can be applied as the transfer protocol. The response to such command may have the structure, e.g., as shown in the following Table 3.

TABLE 3

```
<s:Envelope
xmlns:s="http://schemas.xmlsoap.org/envelope/"
s:encodingStyle="http://schemas.xmlsoap.org/soap/encoding/
"
<s:Boby>
<u:LoadResponse
xmlns:u="urn:schemas-upnp-org:service:AVTransport:1">
<Selected Transport>ftp </Selected Transport>
<SessionId>53 </SessionId>
</u:LoadResponse>
</s:Body>
</s:Envelope>
```

Figure 3:
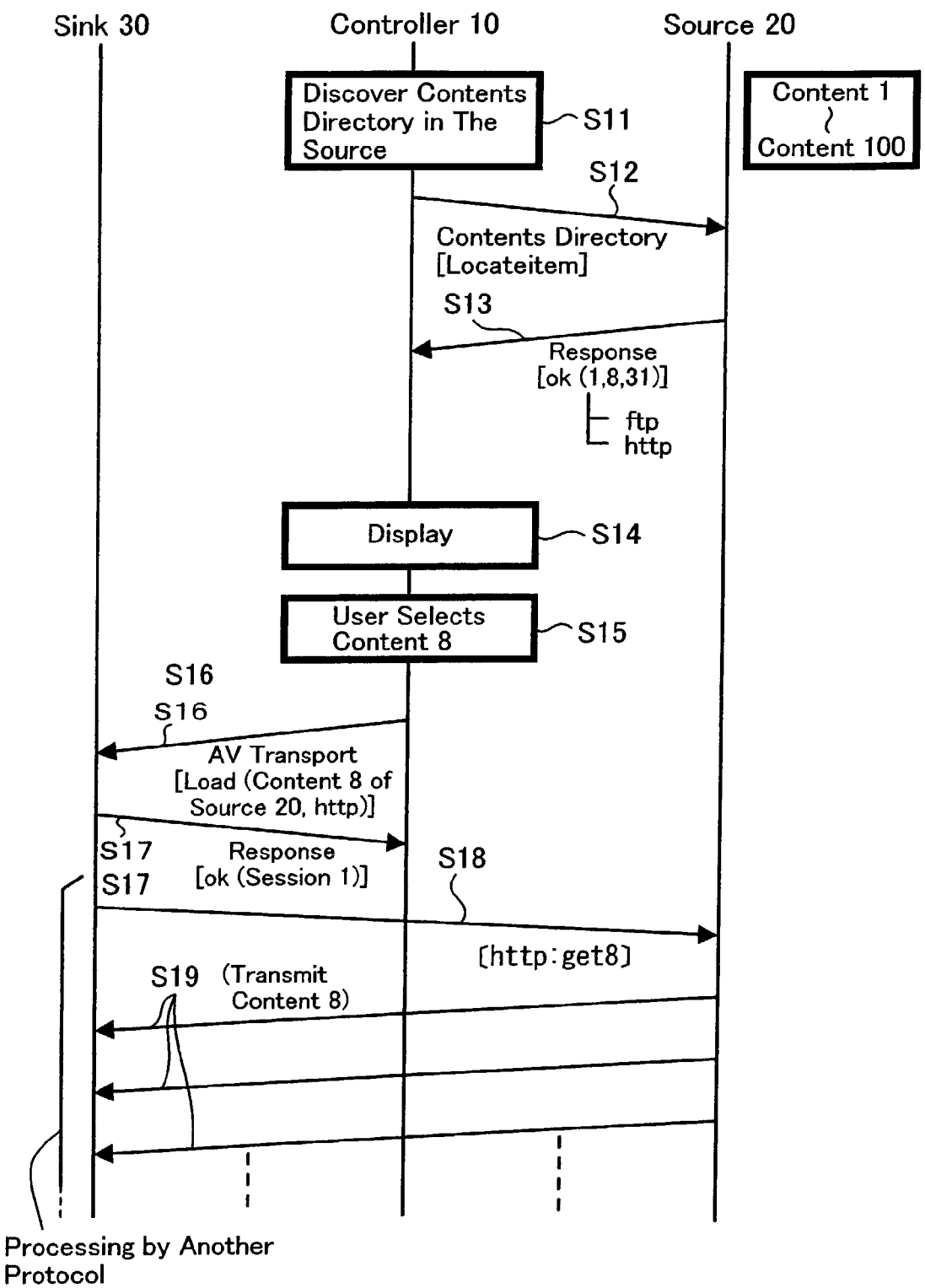
FIG. 3 is a chart showing a first transmission example of the one embodiment according to the present invention.

Then, examples of transmitting these commands through the network 1 will be described. FIG. 3 illustrates a transmission example 1, wherein contents are transmitted from the source (the AV device 20) to the sink (the AV device 30) under control of the controller 10 in this example. Note that in the following description, the AV device 20 is referred to as the source and the AV device 30 is referred to as the sink (or a first sink).

In this example, it is assumed that 100 contents from content 1 to content 100 are stored in the source and that the contents directory relating to the stored contents is made available. Firstly, when the controller 10 discovers the contents directory in the source (step S11), the "LocateItems" command is sent to read the contents directory (step S12). Upon receiving the command, the source returns the information on the transferable contents to the controller as the response (step S13). Suppose 3 contents, e.g., the contents 1, 8, 31 are transferable in this example. In this case, if content 8 can be transferred in both FTP and HTTP as the transfer protocol, this fact is added to the information of the content 8.

Upon receiving the response, the controller has the list of the transferable contents displayed on the screen of the display 18 (step S14). When a user selects any content among the displayed contents by operating the operation key 15 or the like (step S15), the controller sends a command to the sink for loading of the AV transport (step S16). It is assumed that, e.g., the content 8 is selected in step S15, so that the loading command of the AV transport instructs to transfer and receive the contents 8 in the source 20 in the HTTP transfer protocol.

When the sink receives the command of the AV transport and is ready to transfer the data, the response for OK is returned (step S17) and the session number is sent in the response.

Upon completion of the above series of processing, the data of the content 8 is transmitted from the source to the sink in response to the request from the sink. The transmission of the content is carried out, e.g., in the different protocol from the processing described hereinabove and, for example, the sink instructs the source to acquire the content 8 in the HTTP protocol (step S18), thereby sequentially transmitting the data of the content 8 from the source based on the instructions (step S19).

Although the transmission of the contents is performed by way of the network 1 in the example in FIG. 3, it is possible to use the different path from the network 1 for the transmission of the contents data. For example, in the construction as shown in FIG. 1, the source and the sink are interconnected by the IEEE1394 type bus line 2, and it is shown a transmission example in FIG. 4 where transmission is adapted by way of the bus line 2.

Figure 4:
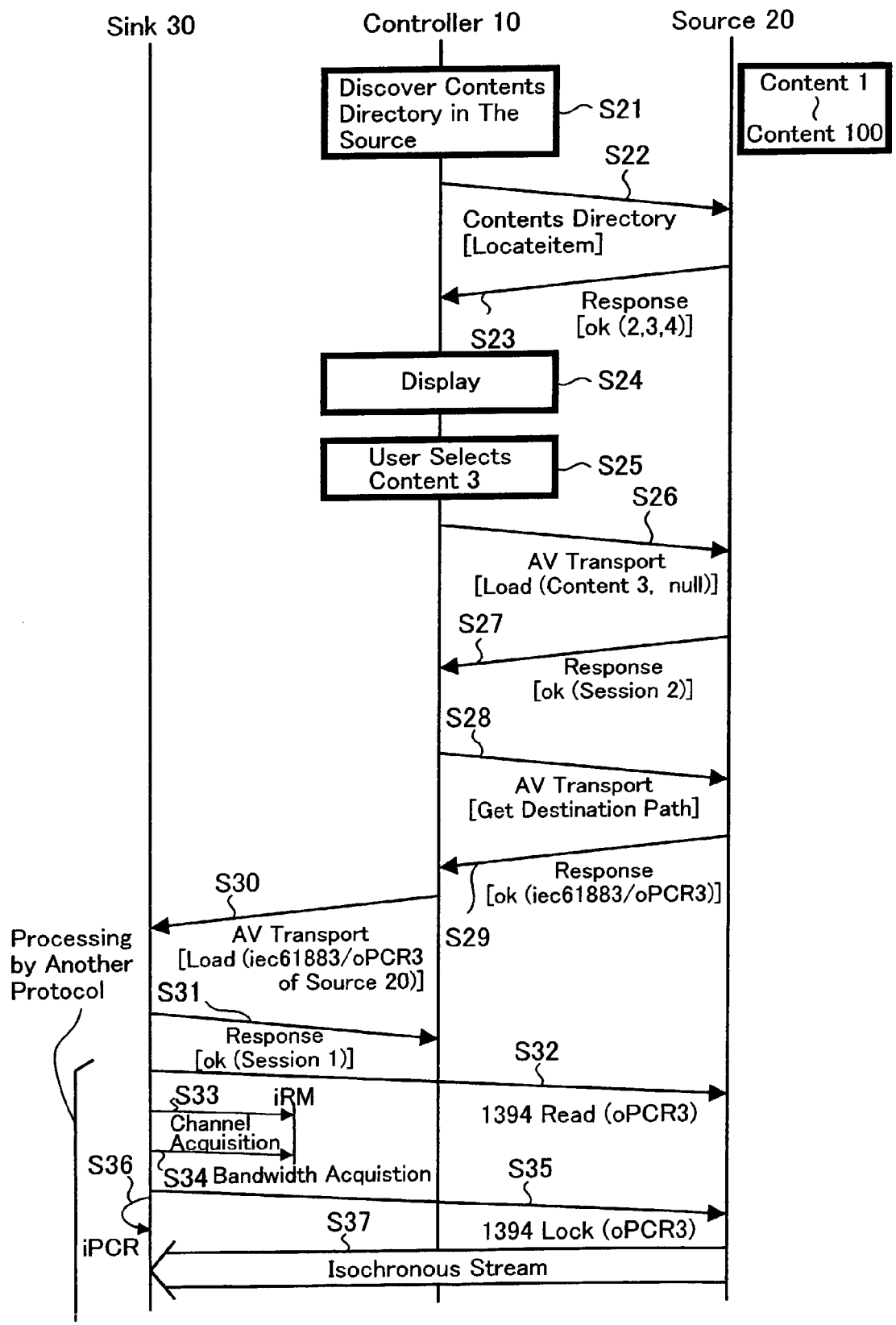
FIG. 4 is a chart showing a second transmission example of the one embodiment according to the present invention.

In describing the transmission example in FIG. 4, it is assumed that 100 contents from content 1 to content 100 are stored in the source and that the contents directory relating to the stored contents is made available. Firstly, when discovering the contents directory in the source (step S21), the controller 10 sends the "LocateItems" command to read the contents directory (step S22). Upon receiving the command, the source returns the information on the transferable contents as the response to the controller (step S23). In this example, let's say 3 contents, e.g., contents 2, 3 and 4 are transferable.

Upon receiving the response, the controller operates to have the transferable contents list displayed on the screen of the display 18 (step S24). When the user selects a specified content among the displayed contents by operating the operation key 15 (step S25), the controller sends the command of the AV transport to the sink (step S26). It is assumed that, e.g., the content 3 is selected in the step S25, so that the command of the AV transport designates the content 3 of the source 20. At this time, since the transmission path is not the network 1, "null" indicating the use of other protocol is shown as the transfer protocol.

If the sink is ready to perform the data transfer at the time when the command of the AV transport is received, the sink returns the response for OK (step S27) and the session number is sent in the response.

Upon completion of the above series of processing, a command of the AV transport is sent to the source for requesting the setting of transmission through the IEEE1394 type bus line 2 (step S28). Upon receiving the command, the sink returns the corresponding setting as the response (step S29). In this particular example, the data in the format in accordance with the iec61883 specification is outputted from the output plug oPCR3, It is to be noted that in case of transmitting the data by the AV/C command using the IEEE1394 type bus the data transmission is carried out by the virtual plug using the register as the input and output plugs, so that such virtual plug is shown herein. In case of using the physical plug depending on the transmission path, such physical plug may be indicated in the same processing.

Upon receiving the response, the controller sends the command for instructing loading of the AV transport to the sink (step S30). In this example, it is instructed to receive the contents of the source 20 at the output plug "oPCR3" of the source as the data formatted in accordance with the iec61883 specification. If the sink is ready to perform data transfer at the time when the command of the AV transport is received, the response OK is returned (step S31) and the session number is sent in its response.

Upon completion of the above series or processing, it is instructed to receive the data of the content 3 outputted from the output plug "oPCR3" in the processing based on the AV/C command using the IEEE1394 type bus 2 (step S32). Also the channel acquisition processing on the bus 2 (step S33) and the bandwidth acquisition processing on the bus 2 (step S34) to the IRM (Isochronous Resource Manager that could be either device 20 or 30) connected to the IEEE1394 type bus 2 are performed. A lock processing is effected between the source based on the acquired channel and bandwidth (step S35), and the input plug (iPCR) is set within the sink (step S36) and the data of the content 3 is transmitted as the stream data in the isochronous transfer using the set input plug, output plug, channel and bandwidth (step S37).

Figure 5:
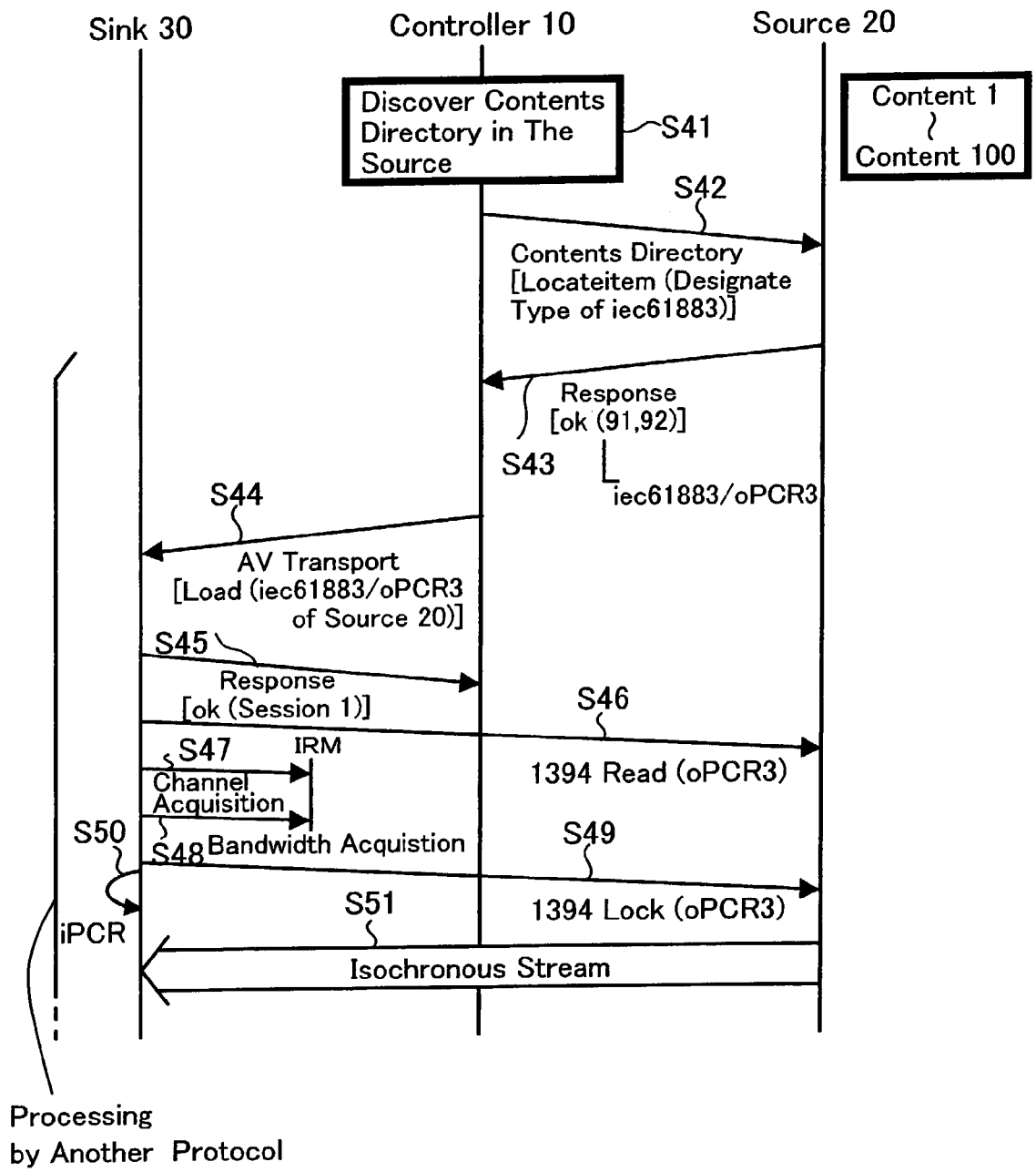
FIG. 5 is a chart showing a third transmission example of the one embodiment according to the present invention.

Now, a transmission example in case that the controller side firstly and directly designates data type is shown in FIG. 5. In this example, it is assumed that 100 contents from content 1 to content 100 are stored in the source and that the contents directory relating to the stored contents is made available. Firstly, when the controller 10 discovers that the contents directory in the source (step S41) "LocateItems" command is sent by designating the iec61883 formatted data in the contents directory (step S42). Upon receiving the command, the source returns to the controller the response of the information on the contents that can be transferred in the corresponding format (step S43). In this example, it is assumed that there are 2 transferable contents, e.g., content 91, 92. At this time, the output plug to be used for each content is also indicated.

When the controller receives the response and a specified content is selected therein, the command of the AV transport is sent to the sink such that the selected content is received (step S44). The command designates the source device, the data format and the output plug.

If the sink is ready to perform the data transfer upon receiving the command of the AV transport, the response for OK is sent back (step S45) and the session number is sent in the response.

Upon completion of the above series of processing, it is instructed to output the corresponding data from the output plug "oPCR3" in the processing based on the AV/C command using the IEEE1394 type bus 2 (step S46). Additionally, the channel acquisition processing on the bus 2 (step S47) and the bandwidth acquisition processing on the bus 2 (step S48) to the IRM connected to the IEEE1394 type bus 2 are performed. And the lock processing is carried out within the source based on the acquired channel and bandwidth (step S49), and further the input plug (iPCR) is set within the sink (step S50), thereby enabling to have the corresponding data transmission as the data stream in the isochronous transfer using the set output plug, input plug, channel and bandwidth (step S51).

Figure 6:
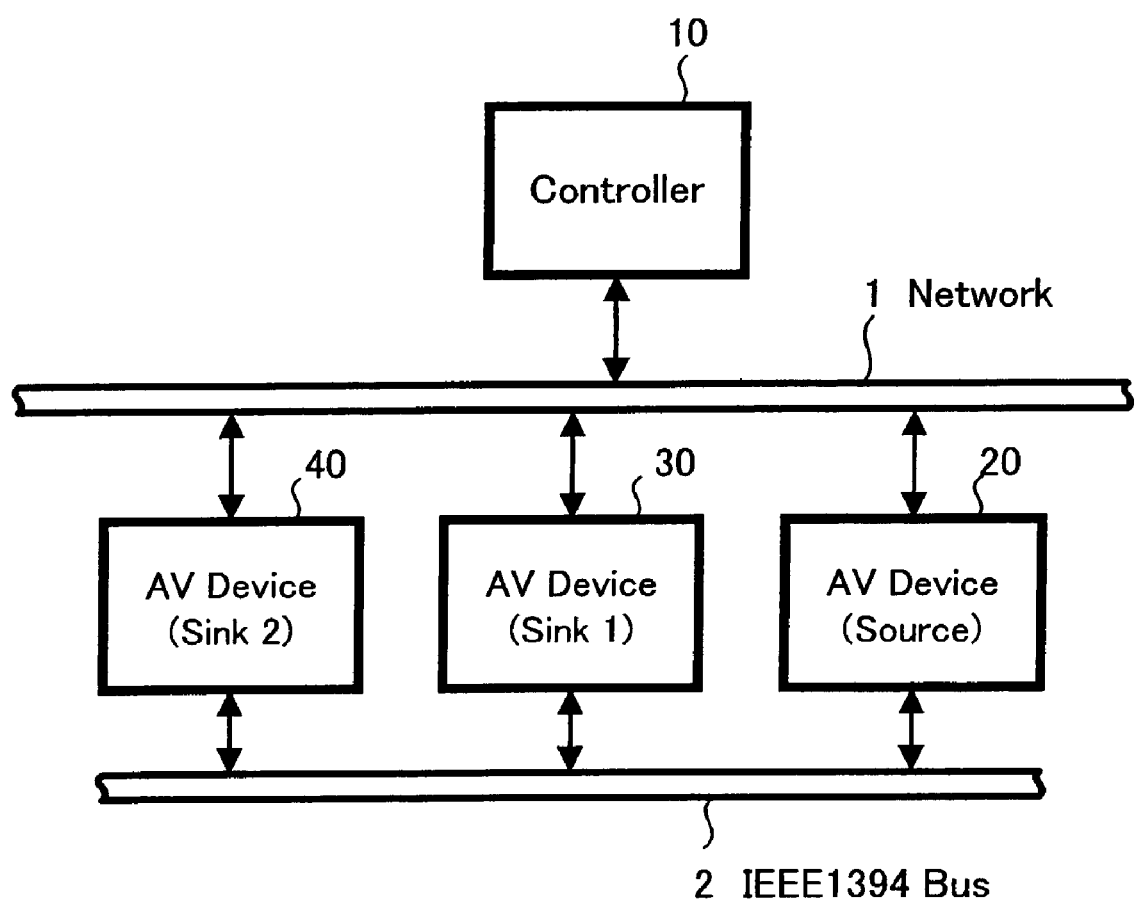
FIG. 6 is a block diagram showing another system configuration of the one embodiment according to the present invention.

Although there is only one sink for receiving the contents data in the above description, it is possible to have 2 sinks. Specifically, it is possible to configure to connect an AV device 40 to the network 1 as a second sink in addition to the AV device 30 as a first sink as shown in FIG. 6. The AV device 40 as the second sink may be connected also to the IEEE1394 type bus 2.

In case of providing 2 sinks in the above manner, the transferred contents may be received by the 2 sinks, e.g., for respectively processing the received data and storing the processed data, and alternatively the data may be received simultaneously by the 2 sinks for processing audio data by the one sink while processing video data by the other sink.

Figure 7:
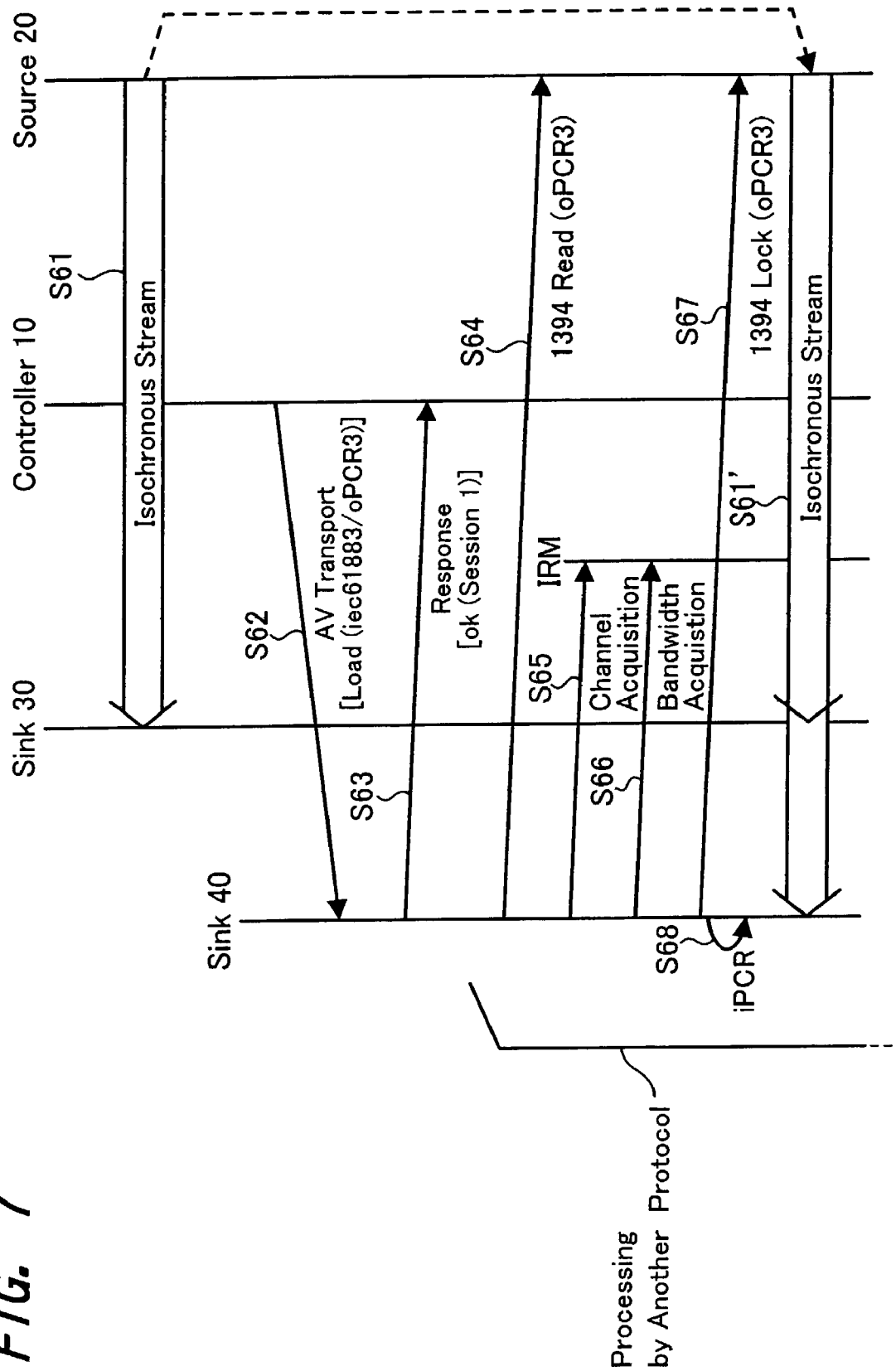
FIG. 7 is a chart showing a fourth transmission example of the one embodiment according to the present invention.

Shown in FIG. 7 is a transmission example using the 2 sinks (AV devices 30, 40). Firstly, in the series of processing as described with reference to FIG. 4 or 5, it is assumed that the stream data is transferred from the source to the first sink by the isochronous transfer (step S61). At this time, the controller sends the command of "load" of AV transport to the second sink by way of the network 1 (step S62). The command designates the source device, data format and the output plug.

If the sink is ready to perform data transfer at the time of receiving the AV transport command, a response for OK is sent back (step S63) and the session number is sent in the response.

Upon completion of the above series of processing, it is instructed to receive the data outputted from the output plug "oPCR3" in the processing based on the AV/C command using the IEEE1394 type bus 2 (step S64). Additionally, to the IRM connected to the IEEE1394 type bus 2, the channel acquisition processing on the bus 2 (step S65) and the bandwidth acquisition processing on the bus 2 (step S66) are carried out. And the lock processing is performed within the source based on the acquired channel and bandwidth (step S67), and also the input plug (iPCR) is set within the second sink (step S68) and the set output plug, input plug, channel and bandwidth are used to have the isochronous transferred stream data received also by the second sink (step S61').

Although it is adapted to receive in accordance with the instruction from the controller in the example in FIG. 7, it is possible to receive the contents data by the request of the second sink (the AV device 40).

Figure 8:
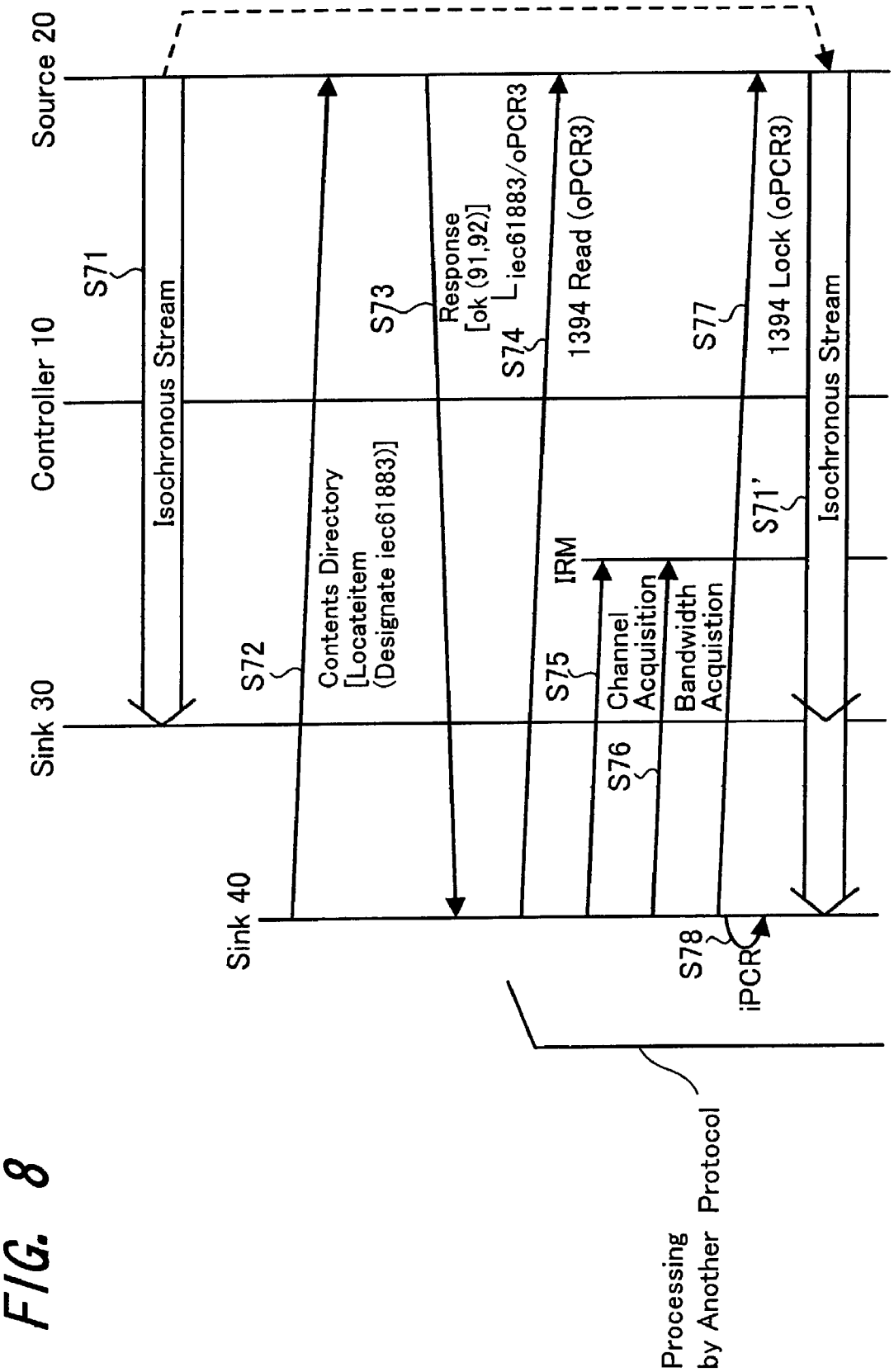
FIG. 8 is a chart showing a fifth transmission example of the one embodiment according to the present invention.

Illustrated in FIG. 8 is an example of such case. Firstly, it is assumed that the stream data are being transmitted by the isochronous transfer from the source to the first sink in the processing as described in FIG. 4 or FIG. 5 (step S71). At this time, the second sink 40 sends the "LocateItems" contents directory command to the source 20 designated in the iec61883 format (step S72). Upon receiving the contents, the source returns the response by adding the output plug data to the contents that can be transmitted in the corresponding format (step S73).

The second sink that received the response instructs to receive the data outputted from the output plug "oPCR3" in the processing based on the AV/C command used in the IEEE1394 type bus 2 (step S74). Additionally, performed are the channel acquisition processing on the bus 2 (step S75) and the bandwidth acquisition processing on the bus 2 (step S76)

for the IRM connected to the IEEE1394 type bus 2. And the lock processing is carried out within the source relating to the acquired channel and bandwidth (step S77), and the input plug (iPCR) is set within the second sink (step S78) and the set output plug, input plug, channel and bandwidth are used to have the stream data in the isochronous transfer received also by the second sink (step S71').

In case of receiving the contents data in response to the request from the second sink (the AV device 40), it is possible to request by directly designating the AV/C command.

Figure 9:
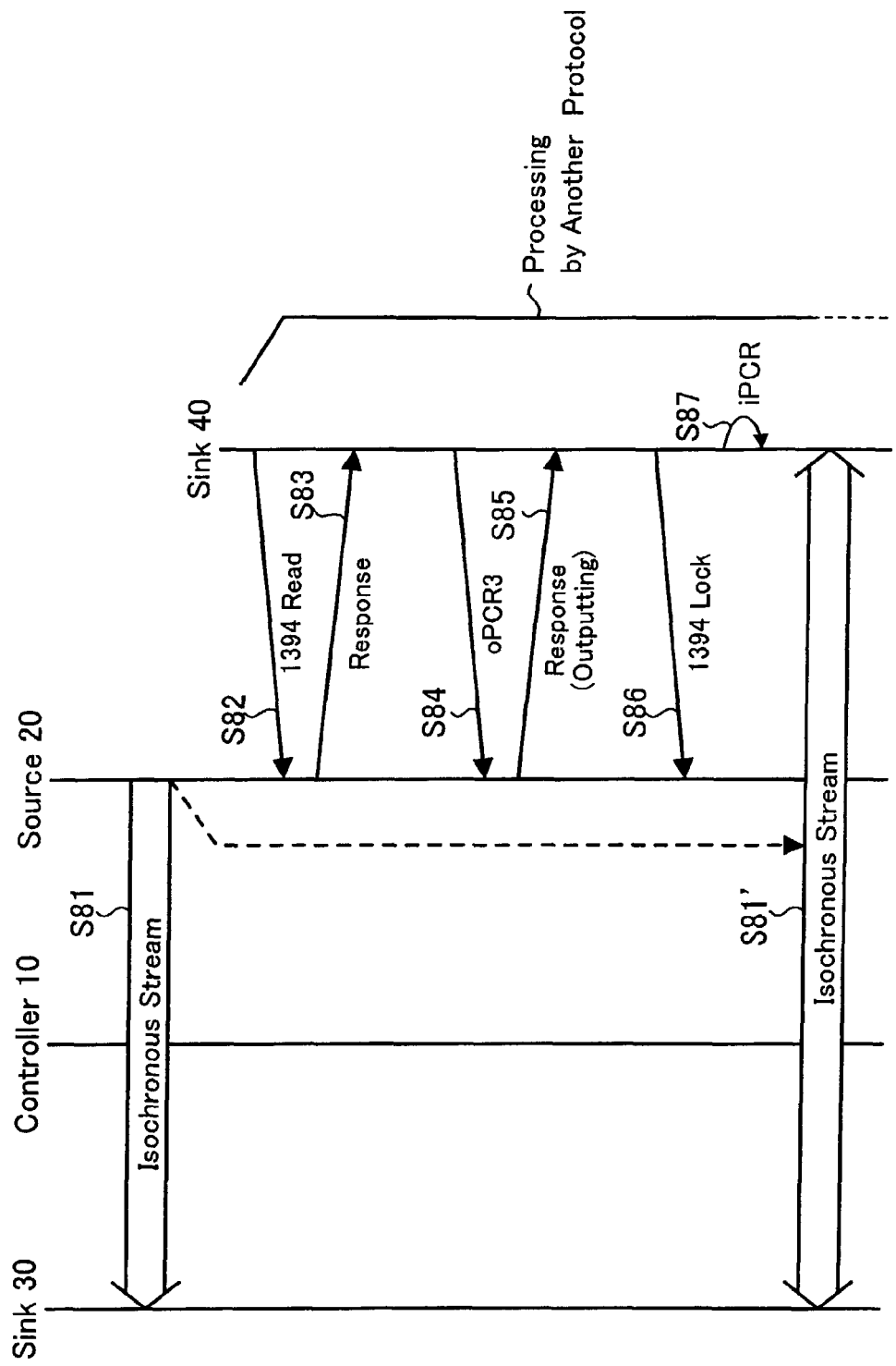
FIG. 9 is a chart showing a sixth transmission example of the one embodiment according to the present invention.

Shown in FIG. 9 is an example in this particular case. Firstly, it is assumed that stream data are being transmitted by the isochronous transfer from the source to the first sink in the processing as described in FIG. 4 or FIG. 5 (step S81). At this time, the second sink 40 instructs the source 20 for receiving the data in the processing based on the AV/C command using the IEEE1394 type bus 2 (step S82). Upon receiving the response to the command (step S83), a command for informing the status of the output plug "oPCR3" is sent (step S84), and if it is known by the response that the outputting is conducted (step S85), a command is sent to lock to the output (step S86), the input plug (iPCR) is set within the second sink (step S87), and the set plug is used to have the stream data in the isochronous transfer received also by the second sink (step S81').

It is possible to effectively transmit the contents by way of the network using a general purpose transfer protocol such as IP network by carrying out the transmission of the contents data as described in the above transmission examples, respectively.

It is to be noted that in case of existence of a plurality of contents receiving devices (sink devices) as illustrated in FIGS. 6~9, adjustment is made for the content transfer protocols and the like among such plurality of sink devices in consideration of the transfer protocols and the like, such that the plurality of devices can process, and thereby enabling to use the protocol set by the adjustment.

It is also possible that when e.g., the first sink device performs loading, the plugs that the sink device can output are dynamically disclosed to the second sink device as the contents directory, thereby enabling the second sink device to receive the loaded data.

Although the data to be transmitted are contents data such as audio data and video data in the above descriptions, it is also possible to perform the file transfer in the same processing by considering files including any data as the similar contents data and indicating therein by the contents directory and the like.

Although a general-purpose network such as Ethernet in accordance with IP protocol is used in the above embodiment, it is of course possible to apply the processing of the present invention to other networks. Moreover, although the network of the IEEE1394 specification bus is used as the network for contents transmission to be used in a combination with the general purpose network, other networks may be used. In this case, the respective networks may be wireless network as the Bluetooth (trademark) specification and the like other than networks using wired transmission path.

Industrial Applicability

According to the present invention, in case of transmitting contents, it is possible to control the start of transmission and the like in the most suitable and correct transfer protocol for transmission of the contents, thereby simplifying the transmission of the contents from the first device to the second device based on the instructions of the controller.

DESCRIPTION OF REFERENCE NUMERALS

1 . . . NETWORK
2 . . . IEEE1394 BUS
10 . . . CONTROLLER
11 . . . CENTRAL PROCESSING UNIT (CPU)
12 . . . PROCESSING BLOCK
13 . . . HARD DISK DRIVE
14 . . . INTERFACE
15 . . . OPERATION KEYS
16, 17 . . . PORT
18 . . . DISPLAY
20 . . . AV DEVICE (SOURCE)
20a . . . CONTENTS DIRECTORY
20b . . . CONNECTOR
20c . . . AV TRANSPORT
21 . . . RECEIVING DEVICE
22 . . . PROCESSING BLOCK
23 . . . HARD DISK DRIVE
24 . . . CENTRAL PROCESSING UNIT (CPU)
25 . . . INTERFACE
26 . . . IEEE1394 INTERFACE
30 . . . AV DEVICE (SINK)
30a . . . CONNECTOR
30b . . . AV TRANSPORT
30c . . . DISPLAY/AUDIO
31 . . . INTERFACE
32 . . . HARD DISK DRIVE
33 . . . PROCESSING BLOCK
34 . . . CENTRAL PROCESSING UNIT (CPU)
35 . . . SPEAKER
36 . . . DISPLAY
26 . . . IEEE1394 INTERFACE
40 . . . AV DEVICE (SECOND SINK)

The invention claimed is:

1. A transmission method for transmitting contents from a first device that stores said contents to a second device via a transmission path, said transmission method comprising the steps of:
designating a predetermined data format and transmitting information indicating all the contents stored in the first device that is transferable in the designated data format:
transmitting each of the contents stored in the first device transferable in the designated data format and information indicating a plurality of transfer protocols which are all of the transfer protocols capable of transferring each of the contents, to a controller on the transmission path, wherein the information indicating the plurality of transfer protocols is expressed by an expressing method of a predetermined format that can be transferred by IP protocol, and selecting, by the controller, a designated transfer protocol among the plurality of transfer protocols capable of transferring each of the contents according to the information transmitted to the controller, wherein said controller instructs said second device to load said contents by designated transfer protocol; and
performing transmission management based on said information at the time of transmission of said contents between said first device and said second device.

2. The transmission method according to claim 1, wherein said information is adapted to list all protocols which can be transmitted by instruction.

3. The transmission method according to claim 1, wherein said information includes information relating to a location identified within the first device.

4. The transmission method according to claim 1, wherein a logical or physical terminal which is used in case of transferring the contents is provided as a virtual content.

5. The transmission method according to claim 1,
wherein a third device for processing or storing said contents is further included in addition to said second device, and said controller is adapted to instruct all of the protocols to each of said second device and the third device.

6. The transmission method according to claim 5, further comprising:
adjusting selection of a protocol used among the instructed transfer protocols between said second device and the third device.

7. The transmission method according to claim 5, wherein said second device or the third device loaded with said contents is adapted to provide a terminal that can be outputted as virtual content.

8. The transmission method according to claim 1, wherein said controller is adapted to transmit, in a designated format command, the instructions for an operation in connection with processing said transmitted contents to said second device when said transmitted contents contain video or audio information.

9. The transmission method according to claim 8, wherein a third device for processing or storing said contents is further included in addition to said second device, and said controller is adapted for transmitting said instructions for the operation in a designated format command in connection with processing the transmitted contents also to said the third device by a designated format command.

10. The transmission method according to claim 1, wherein said contents stored in said first device are a designated file and the upload and download of said file are carried out by said transfer protocol.

11. A transmission apparatus comprising:
communication means for communicating contents between a first device and a second device via a designated transmission path;
control means for instructing said second device to load said contents by a designated transfer protocol;
contents storing means for storing contents,
wherein a predetermined data format is designated by the control means and information indicating all the contents stored in the first device that is transferable in the designated data format is transmitted to the control means, from said communication means;
wherein each of the contents stored in said contents storing means transferable in the designated data format and information indicating a plurality of transfer protocols which are all of the transfer protocols capable of transferring each of the contents are transmitted to the control means, from said communication means, and
wherein the control means selects the designated transfer protocol among the plurality of transfer protocols capable of transferring each of the contents according to the information transmitted to the control means;
wherein the information indicating the plurality of transfer protocols is expressed by an expressing method of a predetermined format that can be transferred by IP protocol.

12. A transmission apparatus according to claim 11, wherein said control means adds information relating to a location identified within the first device as information added to the contents.

13. A transmission apparatus according to claim 11, wherein said communication means is provided with a logical or physical terminal to be used in transferring said contents, and said control means adds to said information listed all protocols which can be transmitted by setting said terminal.

14. A transmission apparatus comprising:
communication means for communicating contents between a first device and a second device via a designated transmission path; and
control means adapted to communicate with the first device by means of said communication means for generating information relating to a content stored in said first device and a first command for requesting the transfer protocol of said content, and adapted to communicate with the second device by means of said communication means for generating a second command instructing a receiving of a particular content in the information acquired in response to said first command by designating a transfer protocol indicated by the information acquired in the response,
wherein a predetermined data format is designated by the control means and information indicating all the contents stored in the first device that is transferable in the designated data format is transmitted to the control means, from said communication means;
wherein the contents and information indicating a plurality of transfer protocols which are all of the transfer protocols capable of transferring said contents are transmitted to the control means, and
wherein the control means selects the designated transfer protocol among the plurality of transfer protocols capable of transferring each of the contents transferable in the designated data format according to the information transmitted to the control means,
wherein the information indicating the plurality of transfer protocols is expressed by an expressing method of a predetermined format that can be transferred by IP protocol.

15. A transmission apparatus according to claim 14, wherein said control means is adapted to transmit the operation instruction in connection with the processing of the transmitted content from said communication means to said first device or the second device by a designated format command when said content transmitted from said first device contains video or audio information.

* * * * *